United States Patent
Isom et al.

(10) Patent No.: US 8,134,494 B1
(45) Date of Patent: Mar. 13, 2012

(54) SIMULATING THE MUTUAL PERFORMANCE OF AN ANTENNA ARRAY COUPLED TO AN ELECTRICAL DRIVE CIRCUIT

(75) Inventors: Robert S. Isom, Allen, TX (US); Gordon R. Scott, Farmersville, TX (US)

(73) Assignee: Raytheon Company, Waltham, MA (US)

( * ) Notice: Subject to any disclaimer, the term of this patent is extended or adjusted under 35 U.S.C. 154(b) by 374 days.

(21) Appl. No.: 12/476,583

(22) Filed: Jun. 2, 2009

Related U.S. Application Data

(60) Provisional application No. 61/132,891, filed on Jun. 24, 2008.

(51) Int. Cl.
*G01S 7/40* (2006.01)
(52) U.S. Cl. ........................................ 342/170; 342/173
(58) Field of Classification Search ................... 342/170
See application file for complete search history.

(56) References Cited

U.S. PATENT DOCUMENTS

| | | | | |
|---|---|---|---|---|
| 5,313,210 A | * | 5/1994 | Gail | 342/25 A |
| 5,927,648 A | | 7/1999 | Woodland | 244/118.1 |
| 6,952,179 B1 | | 10/2005 | Jones | 342/62 |
| 7,117,018 B2 | | 10/2006 | Lewis | 455/562.1 |
| 7,176,828 B2 | | 2/2007 | Tirkel et al. | 342/22 |
| 2003/0076257 A1 | * | 4/2003 | Padros | 342/368 |

* cited by examiner

*Primary Examiner* — Thomas Tarcza
*Assistant Examiner* — Matthew M Barker
(74) *Attorney, Agent, or Firm* — Christie, Parker & Hale, LLP

(57) ABSTRACT

According to one embodiment, simulating the mutual performance of an antenna array coupled to an electrical drive circuit includes receiving one or more cross-coupling matrices and a number of electrical circuit parameters. Each cross-coupling matrix comprises matrix elements that each represent a cross-coupling factor of one antenna element to another antenna element of the antenna array. The electrical circuit parameters model one or more characteristics of the electrical drive circuit. Performance of the microwave antenna array and the electrical drive circuit in a far-field environment is modeled according to the electrical circuit parameters and the cross-coupling matrices.

20 Claims, 3 Drawing Sheets

SIMULATING THE MUTUAL PERFORMANCE OF AN ANTENNA ARRAY COUPLED TO AN ELECTRICAL DRIVE CIRCUIT

RELATED APPLICATION

This application claims benefit under 35 U.S.C. §119(e) of U.S. Provisional Application Ser. No. 61/132,891, entitled "Microwave Array Analysis Technique," filed Jun. 24, 2008, by Robert S. Isom et al.

GOVERNMENT RIGHTS

The U.S. Government may have certain rights in this invention as provided for by the terms of Contract No. W56 HZV-05-C-0724.

TECHNICAL FIELD OF THE DISCLOSURE

This disclosure relates generally to antenna arrays, and more particularly to simulating the mutual performance of an antenna array coupled to an electrical drive circuit in a far-field environment.

BACKGROUND OF THE DISCLOSURE

Microwave communication involves transmitting and receiving electro-magnetic energy that extends from the short wave frequencies to the near infrared frequencies.

Different types of antennas have been developed to utilize electro-magnetic energy at these frequencies. One particular type of microwave antenna is an active electronically scanned array (AESA) comprising a plurality of transmit/receive elements. Each transmit/receive element may be individually controlled to manipulate the polarity, scan pattern, and/or look angle of electro-magnetic signals transmitted or received by the antenna.

SUMMARY OF THE DISCLOSURE

According to one embodiment, simulating the mutual performance of an antenna array coupled to an electrical drive circuit includes receiving one or more cross-coupling matrices and a number of electrical circuit parameters. Each cross-coupling matrix comprises matrix elements that each represent a cross-coupling factor of one antenna element to another antenna element of the antenna array. The electrical circuit parameters model one or more characteristics of the electrical drive circuit. Performance of the microwave antenna array and the electrical drive circuit in a far-field environment is modeled according to the electrical circuit parameters and the cross-coupling matrices.

Certain embodiments of the present disclosure may provide numerous technical advantages. A technical advantage of one embodiment may be that the mutual performance of a microwave antenna array and an electrical drive circuit may be modeled. Modeling the mutual performance may provide a more accurate model.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Active electronically scanned arrays (AESAs) transmit and receive microwave signals at any desired polarity, scan pattern, and/or look angle. Active electronically scanned arrays are typically driven by an electrical drive circuit. The circuit generates electrical signals for transmission by the active electronically scanned array and/or conditions electrical signals received by the active electronically scanned array.

Electrical circuit simulation tools have been developed that mathematically model electrical circuit behavior. Known simulation tools, however, do not model the behavior of the coupling between radiating elements on an active electronically scanned array in conjunction with the electrical drive circuit in a far-field environment.

Embodiments of the present disclosure simulate electro-magnetic radiation due to operation of the electrical drive circuit. Thus, electro-magnetic radiation patterns including the coupling effects transmitted to and received from antenna array may be simulated, which may improve accuracy of the simulation.

Figure 1:
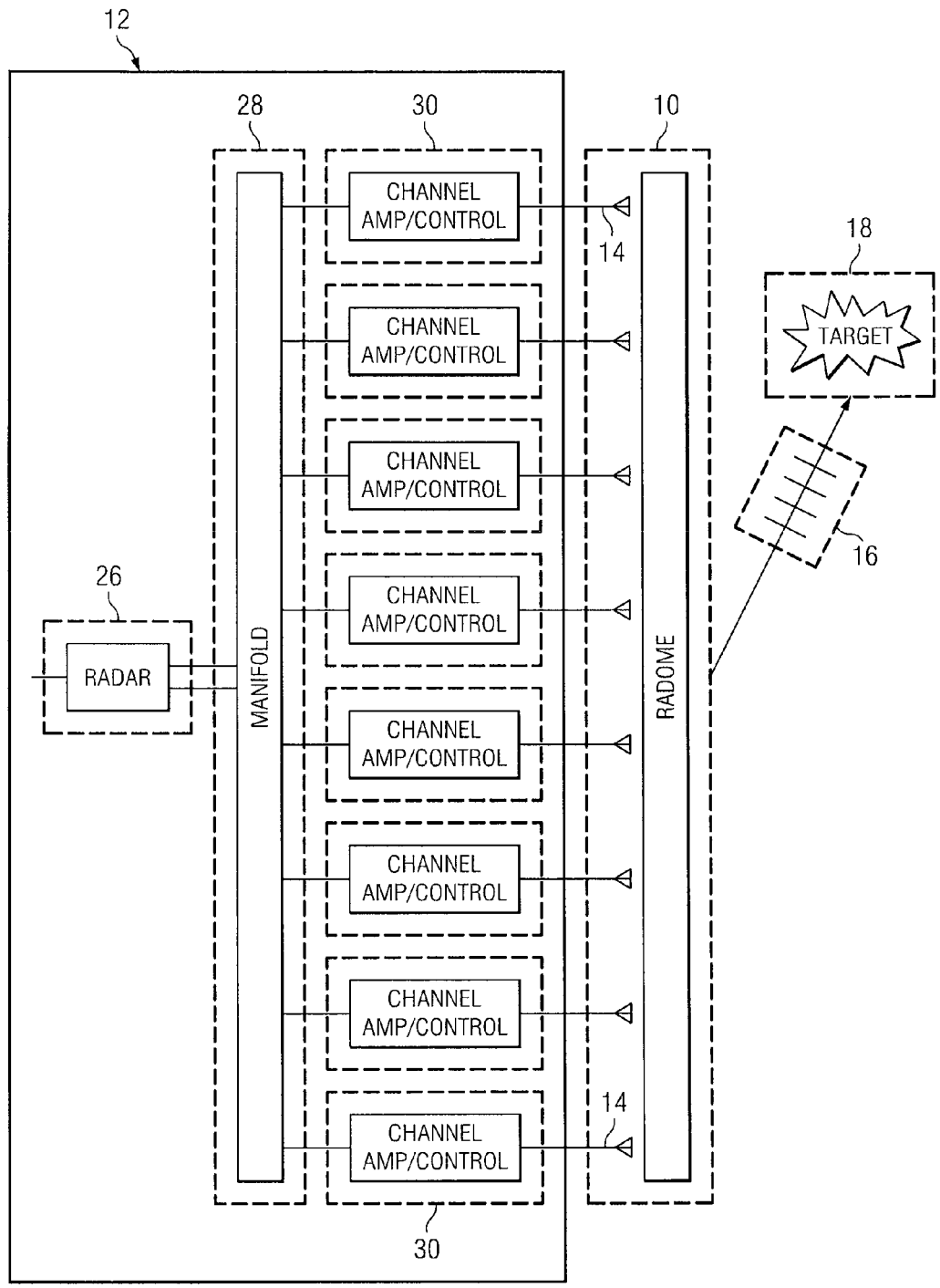
FIG. 1 illustrates one embodiment of an antenna array coupled to an electrical drive circuit for which mutual performance can be modeled.

FIG. 1 illustrates one embodiment of an antenna array 10 coupled to an electrical drive circuit 12 for which mutual performance can be modeled. In certain embodiments, a simulation tool calculates the performance of electrical drive circuit 12 and antenna array 10 according to electrical circuit parameters associated with electrical drive circuit 12 and a cross-coupling matrix that models cross-coupling effects of antenna array 10.

Antenna array 10 transmits and/or receives signals such as microwave signals. In the illustrated embodiment, antenna array 10 includes a number of antenna elements 14. An antenna element 14 receives an electrical signal from electrical drive circuit 12 for conversion to electro-magnetic radiation 16, which is transmitted to a target 18, such as a far-field object. Conversely, antenna element 14 converts electro-magnetic energy from target 18 to electrical signals, which are sent to electrical drive circuit 12.

In certain embodiments, an object is far-field if the distance between the object and the radiator is more than the longest dimension of the radiating structure (for example, the antenna array) squared divided by the wavelength in free space of the radiated energy. A far-field environment may refer to a physical environment in which antenna array 10 transmits signals to and/or receives signal from one or more far-field objects.

Electrical drive circuit 12 may include any electrical component suitable for transmitting and/or receiving electrical signals from antenna array 10. In the illustrated embodiment, electrical drive circuit 12 includes a radar 26, a manifold 28, and a number of control modules 30. A control module 30 may be coupled to one or more antenna elements 14 such that the one or more antenna elements 14 may be excited independently of one another. Independent control of antenna elements 14 may provide for control of various aspects of electro-magnetic radiation 16, such as polarity, scan pattern, and/or look angle.

Figure 2:
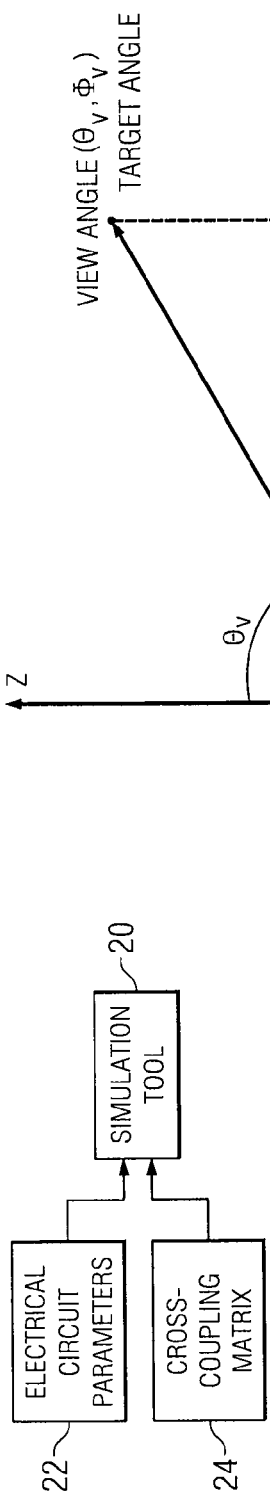
FIG. 2 illustrates an example of a simulation tool that may be used to model the mutual performance of the electrical drive circuit and the antenna array of FIG. 1.

FIG. 2 illustrates an example of a simulation tool that may be used to model the mutual performance of electrical drive circuit 12 coupled to antenna array 10. In certain embodiments, simulation tool 20 models the mutual performance of electrical drive circuit 12 and antenna array 10 according to a plurality of electrical circuit parameters 22 associated with electrical drive circuit 12 and a cross-coupling matrix 24 that models cross-coupling effects of antenna array 10. Simulation tool 20 may model the performance of electrical drive circuit 12 and antenna array 10 at any suitable time, such as during the development phase.

In certain embodiments, performance (represented by output vector C) of antenna array 10 in conjunction with electrical drive circuit 12 may be modeled from cross-coupling matrix 24 (represented by matrix S) and electrical circuit parameters 22 (represented by input excitation vector A) according to the following equation that uses dot multiplication:

$$C = S \cdot A$$

$$\begin{bmatrix} C_1 \\ C_2 \\ C_3 \\ C_4 \\ \cdot \\ C_N \\ F \end{bmatrix} = \begin{bmatrix} S_{1,1} & S_{1,2} & S_{1,3} & S_{1,4} & \cdot & S_{1,N} & Pe^{j\psi_1} \\ S_{2,1} & S_{2,2} & \cdot & \cdot & \cdot & S_{2,N} & Pe^{j\psi_2} \\ S_{3,1} & S_{3,2} & \cdot & \cdot & \cdot & S_{3,N} & Pe^{j\psi_3} \\ S_{4,1} & S_{4,2} & \cdot & \cdot & \cdot & S_{4,N} & Pe^{j\psi_4} \\ \cdot & \cdot & \cdot & \cdot & \cdot & \cdot & \cdot \\ S_{N,1} & \cdot & \cdot & \cdot & \cdot & S_{N,N} & Pe^{j\psi_N} \\ Pe^{j\psi_1} & Pe^{j\psi_2} & Pe^{j\psi_3} & Pe^{j\psi_4} & \cdot & Pe^{j\psi_N} & 0 \end{bmatrix} \cdot \begin{bmatrix} A_1 e^{j\alpha_1} \\ A_2 e^{j\alpha_2} \\ A_3 e^{j\alpha_3} \\ A_4 e^{j\alpha_4} \\ \cdot \\ A_N e^{j\alpha_N} \\ Te^{jp} \end{bmatrix}_{\theta,\phi}$$

Electrical circuit parameters 22 mathematically represent the operation of one or more components of electrical drive circuit 12. In certain embodiments, electrical circuit parameters 22 correspond to settings of the components of electrical drive circuit 12. Parameters 22 correspond to and may determine an input excitation vector A. Vector A includes element $A_i$, where $A_i$ describes electrical signals that appear at antenna element $AE_i$. Input excitation vector A may describe the amplitude and/or phase of the electrical signals, and may assume that one, some, or all other ports are match terminated. Input excitation vector A may include a T-term that represents the far-field excitation of the array due to the return of a prior pulse from target 18.

Cross-coupling matrix 24 models electro-magnetic cross-coupling. In certain embodiments, cross-coupling matrix 24 represents relative energies of signals within electrical drive circuit 12 and the effects that components of the electrical drive circuit 12 have on the signals. In certain embodiments, cross-coupling matrix includes an array of matrix elements 34 that each represent a cross-coupling factor of one particular antenna element 14 to another antenna element 14:

$$\begin{bmatrix} S_{1,1} & S_{1,2} & S_{1,3} & S_{1,4} & \cdot & S_{1,N} & F_{1,N+1} \\ S_{2,1} & S_{2,2} & \cdot & \cdot & \cdot & S_{2,N} & F_{2,N+1} \\ S_{3,1} & S_{3,2} & \cdot & \cdot & \cdot & S_{3,N} & F_{3,N+1} \\ S_{4,1} & S_{4,2} & \cdot & \cdot & \cdot & S_{4,N} & F_{4,N+1} \\ \cdot & \cdot & \cdot & \cdot & \cdot & \cdot & \cdot \\ S_{N,1} & \cdot & \cdot & \cdot & \cdot & S_{N,N} & F_{N,N+1} \\ \hline F_{N+1,1} & F_{N+1,2} & F_{N+1,3} & F_{N+1,4} & \cdot & F_{N+1,N} & F_{N+1,1+1} \end{bmatrix}$$

In certain examples, cross-coupling may be modeled according to a near-field radiation pattern, if, for example, antenna elements 14 are relatively close to one another. In these examples, cross-coupling matrix 24 may include matrix elements S. Matrix element $S_{i,j}$ represents a cross-coupling that may occur at antenna element $AE_i$ in response to electro-magnetic cross coupling with antenna element $AE_j$, where $i,j=1, \ldots, N$.

In other examples, the near-field radiation pattern may not be sufficient. In the examples, cross-coupling matrix 24 may include an additional row and a column of far-field radiation terms F, as well as matrix elements S. Far-field radiation terms F include far-field radiation terms $F_{N+1,j}$ of the last row and far-field radiation terms $F_{i,N+1}$ of the last column. Far-field radiation terms $F_{N+1,j}$ of the last row represent far-field radiation factors of that of radiation that is transmitted by antenna element $AE_j$ to target 18. Far-field radiation terms $F_{i,N+1}$ of the last column represent far-field radiation factors of radiation that is received by each antenna element $AE_i$ from target 18.

In certain embodiments, $F_{N+1,N+1}$ may be set to zero to yield:

$$\begin{bmatrix} S_{1,1} & S_{1,2} & S_{1,3} & S_{1,4} & \cdot & S_{1,N} & Pe^{j\psi_1} \\ S_{2,1} & S_{2,2} & \cdot & \cdot & \cdot & S_{2,N} & Pe^{j\psi_2} \\ S_{3,1} & S_{3,2} & \cdot & \cdot & \cdot & S_{3,N} & Pe^{j\psi_3} \\ S_{4,1} & S_{4,2} & \cdot & \cdot & \cdot & S_{4,N} & Pe^{j\psi_4} \\ \cdot & \cdot & \cdot & \cdot & \cdot & \cdot & \cdot \\ S_{N,1} & \cdot & \cdot & \cdot & \cdot & S_{N,N} & Pe^{j\psi_N} \\ \hline Pe^{j\psi_1} & Pe^{j\psi_2} & Pe^{j\psi_3} & Pe^{j\psi_4} & \cdot & Pe^{j\psi_N} & 0 \end{bmatrix}$$

An example method for determining the phase characteristics of the far-field factors is described in more detail with reference to FIG. 3.

Cross-coupling factors may be determined in any suitable manner, such as empirically or using an electro-magnetic modeling tool, for example, the High Frequency Structural Simulator (HFSS) from the ANSOFT CORPORATION. In one embodiment, cross-coupling factors CC may be calculated according to a free space range equation:

$$CC = Gt + Gr - 20\log_{10}\left(\frac{4\pi d}{\lambda}\right)$$

where Gt and Gr represent estimated gains of antenna elements in the direction of coupling, and d represents the distance between antenna elements.

In one embodiment, the far-field factors may be determined by modeling antenna array 10 as an infinite array simulation environment to simply simulation of the electromagnetic effects of the far-field factors.

In the embodiments, performance may be represented by output vector C resulting from input excitation vector A. Output vector C may include element F and coupling terms C. Element F represents array gain, or the voltage at target 18 due to a given array excitation. Coupling terms C represent the coupling terms to some or all array elements 14 of array 10 for the given input excitations. If there are no multipath reflections, output vector C is as shown. If there are multipath reflections, then coupling terms C connect to the electrical drive circuit components to describe the multipath effect of the reflections and how they affect the coupling values and the far-field array gain term.

The matrix multiplication operation creates an equation for F that is the same form as an array factor equation for a phased array:

$$F(\theta, \phi) = \cdot \sum_{i=1}^{I} \{A_i e^{j\alpha_i}\} \{P(\theta, \phi,) \cdot e^{j\psi_i(\theta,\phi)}\}$$

$$G = (F)^2$$

$$P = (\theta, \phi,)$$

The element patterns may be assumed to be the same, so the patterns can be taken out of the summation.

In certain embodiments, the process may be repeated for different look angles to target 18. A look angle is a particular view angle in visible space. In the embodiments, different amounts of radiation may be directed toward different look angles. If a look angle is coordinated with the peak of a beam scan angle for which the electronics are set to yield a maximum, the look angle may yield the array gain peak. If a look angle is coordinated with the array null for which the electronics are set to yield a minimum, the look angle may yield a much reduced array gain.

In the embodiments, first and second cross-coupling matrices may be used. The first cross-coupling matrix comprises first far-field radiation terms, where each first far-field radiation term represents a first far-field coupling factor of one antenna element to a target at a first look angle. The second cross-coupling matrix comprises second far-field radiation terms, where each second far-field radiation term represents a second far-field coupling factor of one antenna element to the target at a second look angle. The matrix elements 34 do not change over varying view angles.

In this particular example, all antenna elements 14 are perfectly match terminated. In other examples, antenna elements 14 may have a level of mismatch. In the other examples, one or more additional matrices may be generated that include matrix elements with values that indicate reflected energy due to the mismatch.

Simulation tool 20 may simulate the performance of electrical drive circuit 12 and antenna array 10 using any technique, such as by nodal analysis, mesh analysis, or using S parameters, Y parameters, T parameters, or Z parameters. In one embodiment, simulation tool 20 may utilize any suitable logic, such as one or more processors that execute software in a memory. Examples of software include ADVANCED DESIGN SYSTEM (ADS) Electronic Design Automation (EDA) software from AGILENT TECHNOLOGIES of Palo Alto, Calif.; MICROWAVE OFFICE available from APPLIED WAVE RESEARCH, INCORPORATED of El Segundo, Calif.; or DESIGNER or NEXXIM from ANSOFT CORPORATION of Pittsburgh, Pa.

Figure 3:
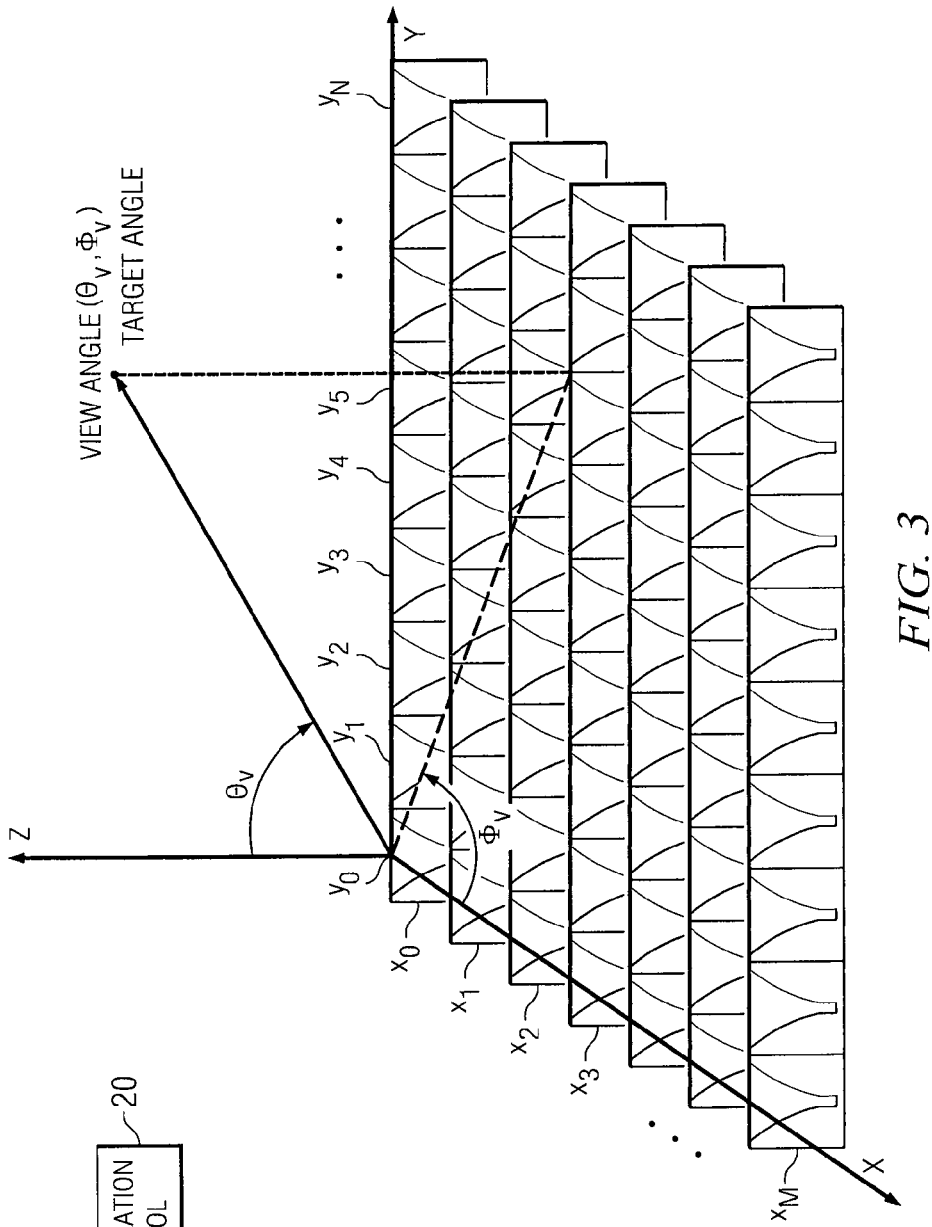
FIG. 3 illustrates an example of determining the phase characteristics of the far-field factors.

FIG. 3 illustrates an example of determining the phase characteristics of the far-field factors. The following equation gives the phase $\psi_{m,n}$ of the $(m,n)^{th}$ element to use in order to view the array from $(\theta_v, \phi_v)$ (measured from the Z-axis):

$$\psi_i = \psi_{m,m} = \beta_0(x_m \sin\theta_v \cos\phi_v + y_n \sin\theta_v \sin\phi_v)$$

where:
m=element index in the X-direction;
n=element index in the Y-direction;
$x_m$=m*d, element X-location;
$y_n$=n*d, element Y-location;
d=inter-element spacing (for example, 0.175");
$\beta_0 = 2\pi\lambda_0$=free-space propagation constant; and
i=a linear index to the elements.

In certain embodiments, index i may server as the index (row or column) to the S-matrix. In the embodiments, $\psi_{i,j}$ is the output of element i due to a input at element j, with some or all other elements off and match terminated.

Figure 4:
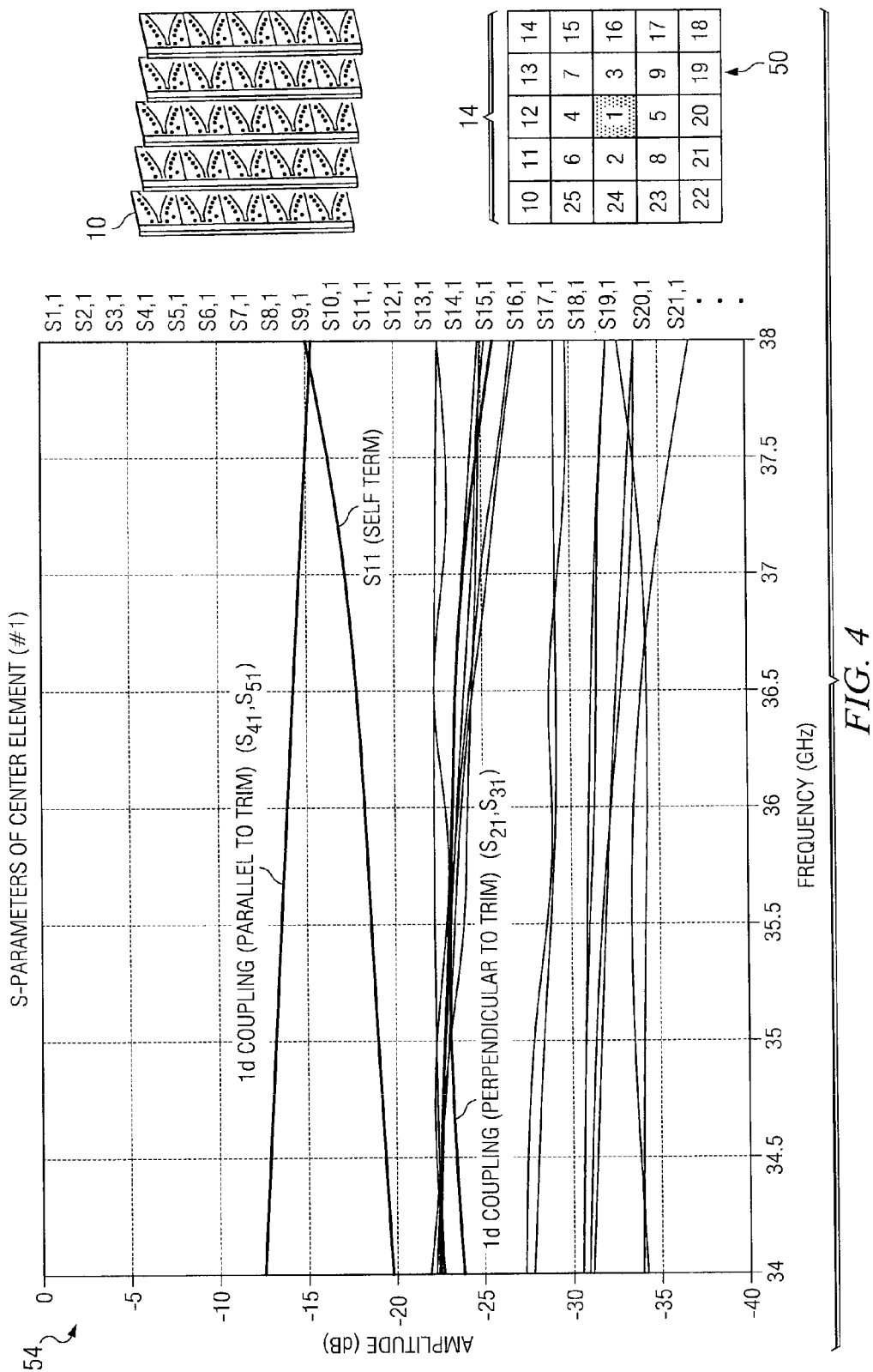
FIG. 4 illustrates an example of results from the model of an array.

FIG. 4 illustrates an example of results from the model of an array. In the example, antenna array 10 is a 5×5 array with antenna elements 14 labeled as shown in chart 50. Graph 54 shows coupling values from the 25 elements to the center element #1. In the example, calculations were performed across a 34-38 GHz band.

A component of the embodiments disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may perform the operations and execute the methods of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to the systems (including apparatuses) described herein without departing from the scope of the invention. The components of the systems may be integrated or separated. Moreover, the operations of the systems may be performed by more, fewer, or other components. Additionally, operations of the systems may be performed using any suitable logic comprising software, hardware, and/or other logic. As used in this document, "each" refers to each member of a set or each member of a subset of a set. A subset of a set may include zero, one, or more elements of the set.

Modifications, additions, or omissions may be made to the methods described herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed:

1. An apparatus comprising:
one or more interfaces configured to:
receive one or more cross-coupling matrices each comprising a plurality of matrix elements, each matrix element representing a cross-coupling factor of one antenna element to another antenna element of a microwave antenna array comprising a plurality of antenna elements;
receive a plurality of electrical circuit parameters, the electrical circuit parameters modeling one or more characteristics of an electrical drive circuit coupled to the microwave antenna array; and
one or more processors coupled to the one or more interfaces and configured to:
model performance of the microwave antenna array and the electrical drive circuit in a far-field environment according to the plurality of electrical circuit parameters and the cross-coupling matrices.

2. The apparatus of claim 1, the electrical circuit parameters represented by an input excitation vector that describes a plurality of electrical signals that appear at the antenna elements.

3. The apparatus of claim 1, the plurality of matrix elements comprising:
a plurality of far-field radiation terms, each far-field radiation term representing a far-field coupling factor of an antenna element and a target.

4. The apparatus of claim 1, the plurality of matrix elements comprising:
a plurality of first far-field radiation terms, each first far-field radiation term representing a first far-field radiation factor of radiation that is transmitted by an antenna element to a target; and
a plurality of second far-field radiation terms, each second far-field radiation term representing a second far-field radiation factor of radiation that is received by the antenna element from the target.

5. The apparatus of claim 1, the one or more processors further configured to:
determine the plurality of matrix elements according to a free space range equation.

6. The apparatus of claim 1, the one or more cross-coupling matrices comprising:
a first cross-coupling matrix comprising a plurality of first far-field radiation terms, each first far-field radiation term representing a first far-field coupling factor of one antenna element and a target at a first look angle; and
a second cross-coupling matrix comprising a plurality of second far-field radiation terms, each second far-field radiation term representing a second far-field coupling factor of one antenna element and the target at a second look angle.

7. The apparatus of claim 1, the one or more processors further configured to model performance of the microwave antenna array and the electrical drive circuit by:
performing dot multiplication on a cross-coupling matrix and an input excitation vector representing the electrical circuit parameters.

8. A method comprising:
receiving, by an electrical circuit simulation tool, one or more cross-coupling matrices each comprising a plurality of matrix elements, each matrix element representing a cross-coupling factor of one antenna element to another antenna element of a microwave antenna array comprising a plurality of antenna elements;
receiving, by the electrical circuit simulation tool, a plurality of electrical circuit parameters, the electrical circuit parameters modeling one or more characteristics of an electrical drive circuit coupled to the microwave antenna array; and
modeling, by one or more microprocessors, performance of the microwave antenna array and the electrical drive circuit in a far-field environment according to the plurality of electrical circuit parameters and the cross-coupling matrices.

9. The method of claim 8, the electrical circuit parameters represented by an input excitation vector that describes a plurality of electrical signals that appear at the antenna elements.

10. The method of claim 8, the plurality of matrix elements comprising:
a plurality of far-field radiation terms, each far-field radiation term representing a far-field coupling factor of an antenna element and a target.

11. The method of claim 8, the plurality of matrix elements comprising:
a plurality of first far-field radiation terms, each first far-field radiation term representing a first far-field radiation factor of radiation that is transmitted by an antenna element to a target; and
a plurality of second far-field radiation terms, each second far-field radiation term representing a second far-field radiation factor of radiation that is received by the antenna element from the target.

12. The method of claim 8, further comprising:
determining the plurality of matrix elements according to a free space range equation.

13. The method of claim 8, the one or more cross-coupling matrices comprising:
a first cross-coupling matrix comprising a plurality of first far-field radiation terms, each first far-field radiation term representing a first far-field coupling factor of one antenna element and a target at a first look angle; and
a second cross-coupling matrix comprising a plurality of second far-field radiation terms, each second far-field radiation term representing a second far-field coupling factor of one antenna element and the target at a second look angle.

14. The method of claim 8, the modeling performance of the microwave antenna array and the electrical drive circuit comprising:
performing dot multiplication on a cross-coupling matrix and an input excitation vector representing the electrical circuit parameters.

15. An apparatus comprising:
one or more interfaces configured to:

receive one or more cross-coupling matrices each comprising a plurality of matrix elements, each matrix element representing a cross-coupling factor of one antenna element to another antenna element of a microwave antenna array comprising a plurality of antenna elements;

receive a plurality of electrical circuit parameters, the electrical circuit parameters modeling one or more characteristics of an electrical drive circuit coupled to the microwave antenna array; and one or more processors coupled to the one or more interfaces and configured to:

model performance of the microwave antenna array and the electrical drive circuit in a far-field environment according to the plurality of electrical circuit parameters and the cross-coupling matrices by performing dot multiplication on a cross-coupling matrix and an input excitation vector representing the electrical circuit parameters, the input excitation vector describing a plurality of electrical signals that appear at the antenna elements.

16. The apparatus of claim 15, the plurality of matrix elements comprising:

a plurality of far-field radiation terms, each far-field radiation term representing a far-field coupling factor of an antenna element and a target.

17. The apparatus of claim 15, the plurality of matrix elements comprising:

a plurality of first far-field radiation terms, each first far-field radiation term representing a first far-field radiation factor of radiation that is transmitted by an antenna element to a target; and a plurality of second far-field radiation terms, each second far-field radiation term representing a second far-field radiation factor of radiation that is received by the antenna element from the target.

18. The apparatus of claim 15, the one or more processors further configured to:

determine the plurality of matrix elements according to a free space range equation.

19. The apparatus of claim 15, the one or more cross-coupling matrices comprising:

a first cross-coupling matrix comprising a plurality of first far-field radiation terms, each first far-field radiation term representing a first far-field coupling factor of one antenna element and a target at a first look angle; and a second cross-coupling matrix comprising a plurality of second far-field radiation terms, each second far-field radiation term representing a second far-field coupling factor of one antenna element and the target at a second look angle.

20. The apparatus of claim 15, the microwave antenna array configured to:

transmit a plurality of first signals to a far-field object; and receive a plurality of second signals from the far-field object.

* * * * *